(12) United States Patent
Wasyluk et al.

(10) Patent No.: US 9,347,686 B2
(45) Date of Patent: May 24, 2016

(54) SOLAR RECEIVER WITH DUAL-EXPOSURE HEAT ABSORPTION PANEL

(71) Applicant: Babcock & Wilcox Power Generation Group, Inc., Barberton, OH (US)

(72) Inventors: David T Wasyluk, Mogadore, OH (US); David L Kraft, Massilon, OH (US); Justin A Persinger, Norton, OH (US); Jason M Marshall, Wadsworth, OH (US); Melvin J Albrecht, Homeworth, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 488 days.

(21) Appl. No.: 13/677,545

(22) Filed: Nov. 15, 2012

(65) Prior Publication Data

US 2013/0118481 A1    May 16, 2013

Related U.S. Application Data

(60) Provisional application No. 61/560,512, filed on Nov. 16, 2011.

(51) Int. Cl.
| | |
|---|---|
| F24J 2/24 | (2006.01) |
| F01K 27/00 | (2006.01) |
| F24J 2/07 | (2006.01) |
| F24J 2/46 | (2006.01) |
| F28F 9/013 | (2006.01) |

(52) U.S. Cl.
CPC .... *F24J 2/24* (2013.01); *F24J 2/07* (2013.01); *F24J 2/4636* (2013.01); *F24J 2002/4656* (2013.01); *F28F 9/0132* (2013.01); *Y02E 10/41* (2013.01); *Y02E 10/44* (2013.01)

(58) Field of Classification Search
CPC ............ F22B 1/006; F24J 2/07; F24J 2/5201; F24J 2/5203; F24J 2/523; F24J 2/5232; F24J 2002/522
USPC ............ 126/510, 645, 651, 663, 670; 165/47, 165/68
See application file for complete search history.

(56) References Cited

U.S. PATENT DOCUMENTS

| | | | | |
|---|---|---|---|---|
| 4,292,956 | A | * | 10/1981 | Wasserman .................... 126/651 |
| 5,482,233 | A | * | 1/1996 | Marko et al. .................... 248/73 |
| 5,722,354 | A | * | 3/1998 | Sansoucy ........................ 122/510 |
| 2008/0282997 | A1 | * | 11/2008 | Gayheart et al. .............. 122/441 |
| 2009/0178779 | A1 | * | 7/2009 | White et al. ..................... 165/47 |
| 2010/0252025 | A1 | * | 10/2010 | Kroizer et al. ................. 126/600 |
| 2013/0118480 | A1 | * | 5/2013 | Kraft et al. ..................... 126/663 |

* cited by examiner

*Primary Examiner* — Avinash Savani
*Assistant Examiner* — Vivek Shirsat
(74) *Attorney, Agent, or Firm* — Eric Marich

(57) ABSTRACT

A dual-exposure heat absorption panel is disclosed, which can be used in a solar receiver design. Generally, the heat absorption panel includes a tube panel through which a heat transfer fluid is flowed to absorb solar energy from heliostats that are focused on the tube panel. A structural support frame surrounds the tube panel. A stiffener structure runs across the exposed faces of the tube panel. The headers and other support structures on the periphery are protected by use of a heat shield.

31 Claims, 15 Drawing Sheets

SOLAR RECEIVER WITH DUAL-EXPOSURE HEAT ABSORPTION PANEL

This application claims priority to U.S. Provisional Patent Application Ser. No. 61/560,512, filed on Nov. 16, 2011. The disclosure of this application is hereby fully incorporated herein by reference in its entirety.

BACKGROUND

The present disclosure relates broadly to the field of solar power generation used to produce electricity. More particularly, this disclosure relates to a dual-exposure or two-sided heat absorption panel, and a solar receiver including one or more of such panels. These solar receiver designs can be used with Concentrated Solar Tower technology, also known as Concentrating Solar Power (CSP) technology to harness the sun's energy to produce "green" electricity.

A solar receiver is a primary component of a solar energy generation system whereby sunlight is used as a heat source for the eventual production of superheated high quality steam that is used to turn a turbine generator, and ultimately produce electricity using the Rankine cycle or provide steam for other thermal processes.

Generally, the solar receiver is positioned on top of an elevated support tower which rises above a ground level or grade. The solar receiver is strategically positioned within an array of reflective surfaces, namely a field of heliostats (or mirrors), that collect rays of sunlight and then reflect and concentrate those rays back to the heat absorbing surfaces of the solar receiver. This solar energy is then absorbed by the working heat transfer fluid (HTF) flowing through the solar receiver. The reflective surfaces may be oriented in different positions throughout the day to track the sun and maximize reflected sunlight to the heat absorbing surfaces of the receiver.

The solar receiver is an assembly of tubes with water, steam, molten salts, or other heat transfer fluid (HTF) flowing inside the tubes. The HTF inside the tubes of the receiver absorbs the concentrated solar energy, causing the HTF to increase in temperature and/or change phases, so that the HTF captures the solar energy. The heated HTF is then either directly routed to a turbine generator to generate electrical power or is indirectly routed to a storage tank for later use.

Solar receiver designs typically include an arrangement of panels with vertically oriented tubes, i.e. tube panels, along with a support structure for maintaining the tube panels in place and other associated equipment (pumps, pipes, storage vessels, heat shields, etc.). In conventional designs, the solar receiver has a square, rectangular, or circular cross-section (in a plan view from above). The tube panels are arranged on the exterior of the cross-section, so that the solar energy from the heliostats is directed at (and absorbed by) only one face of a tube panel. This is illustrated in, for example, U.S. patent application Ser. No. 12/605,241, which is entitled "Shop-Assembled Solar Receiver Heat Exchanger" and is assigned to Babcock & Wilcox Power Generation Group, Inc., and which is hereby fully incorporated by reference herein.

In this regard, FIG. 1 is a plan view (i.e. viewed from above) of one solar receiver design 100 discussed above, which has four tube panels 110, 120, 130, 140, arranged as a square. Each tube panel has one exterior face 112, 122, 132, 142 which is exposed to solar energy from heliostats, and one interior face 114, 124, 134, 144 which is not exposed to such solar energy.

The interior non-absorbing face of a tube panel usually has a buckstay system that supports the tube panels against high wind, seismic forces, and thermally induced forces. The buckstay system typically includes "I" beams or other structural steel shapes that are clipped onto the tube panel in such a way that the tube panel can expand independent of the support structure itself and independent of the other tubes and panels. Clips are usually welded to the tubes so that the tube panel can move relative to the stationary support structure when heat is applied to the tubes, yet the support structure can still provide rigidity to the tube panel. On a solar receiver, the tubes in the tube panel are not welded together along their axes (i.e. membrane construction) as in a fossil fuel fired boiler, but are of loose construction. This allows the tubes to expand independently of each other when heat is applied. As a result, each tube must have a clip to attach to the buckstay at a support elevation.

One problem that results due to only one face of a tube being exposed to solar energy is that a temperature differential arises between the exposed hot face and the non-exposed cold face. This results in differential expansion between the hot and cold faces of the tube, which causes the tube to bow. The severity of bowing depends on the magnitude of the temperature differential and the rigidity of the tube panel. Because the clip connecting the tube to the buckstay keeps the tube in place at the support elevation, bowing occurs between support elevations. This creates high compressive stress on the heated side of the tube at each support elevation.

Due to daily heating and cooling of the tubes during startup, shutdown, and cloud passages, such stresses are cyclic, which can eventually lead to fatigue failure. For receivers that use molten salt as the HTF, impurities in the molten salt can also cause corrosion, which can be exacerbated where stress is located.

BRIEF DESCRIPTION

The present disclosure relates, in various embodiments, to heat absorbing tube panels and solar receivers incorporating such panels that are exposed to solar energy on two opposite faces. Compared to panels that absorb energy on a single face, heat absorption on two faces can reduce the temperature differential between the hot face and the cold face and therefore provide more uniform tube temperature around the circumference of the tube. This results in significantly reduced thermal stresses in the tube and lower potential for tube failures. With lower tube stresses, the risk of failure due to stress corrosion is also reduced. Also, for a given panel size the available heat absorbing area is doubled compared to a single side heated panel. The combination of reduced stresses and doubled absorbing area results in a panel that can accept more than twice as much solar energy, significantly increasing the efficiency of the panel. The solar receivers comprise an arrangement of heat transfer surfaces, a heat transfer fluid system structurally and functionally interconnected thereto, a vertical support structure, and a stiffener structure. Various structural features and other additions are also described herein.

More particularly, disclosed in embodiments herein is a dual-exposure heat absorption panel, comprising a tube panel and a structural support frame. The tube panel has a first exposed face, a second exposed face opposite the first face, an upper edge, a lower edge, a first side edge, and a second side edge. The tube panel comprises a plurality of vertical tubes for conveying a heat transfer fluid, wherein the tubes are interconnected by at least one upper header and at least one lower header. The structural support frame runs along the upper edge, the first side edge, and the second side edge of the tube panel.

At least one panel support rod may extend between the structural support frame and the upper header to connect the tube panel to the structural support frame.

The tube panel generally includes a plurality of tube passes, with adjacent tube passes being arranged so that heat transfer fluid flows upward through one tube pass and down through another tube pass.

The dual-exposure panel may further comprise a first stiffener structure running from the first side edge to the second side edge across the first face and the second face of the tube panel at a first support elevation.

In particular embodiments, the stiffener structure is formed from a first support assembly and a second support assembly. Each support assembly includes: a support tube; a horizontal flange extending from the support tube and having a slot therein; and a scallop bar engaging the tube panel and having at least one lug, the scallop bar engaging the horizontal flange by a pin passing through the at least one lug and the slot of the horizontal flange.

The support tube of each support assembly may have a different diameter from any tube in the tube panel, and in some embodiments is larger. An outer face of each support tube may be coated or painted to decrease heat absorption.

The two-sided panel may further comprise a second stiffener structure running from the first side edge to the second side edge across the first face and the second face of the tube panel at a second support elevation. Generally, the first support elevation and the second support elevation are not located at a middle section of the tube panel. Additional stiffener structures are contemplated depending on the height of the two-sided panel.

The structural support frame may include a first vertical column, a second vertical column, and an upper horizontal beam extending from an upper end of the first vertical column to an upper end of the second vertical column. In embodiments, the structural support frame further comprises a first heat shield framing the first face of the tube panel, and a second heat shield framing the second face of the tube panel.

The first heat shield and the second heat shield can be painted to decrease heat absorption. Similarly, the first face and the second face of the tube panel can be painted to increase heat absorption.

The lower header may be guided in its travel within the absorption panel.

The two-sided panel may further comprise a base platform upon which the structural support frame rests.

Also disclosed in various embodiments does a solar receiver comprise at least one dual-exposure heat absorption panel as described above.

The solar receiver may have two dual-exposure heat absorption panels, wherein one heat absorption panel is located above and oriented at an angle to the other heat absorption panel.

In another variation, the solar receiver has four dual-exposure heat absorption panels, wherein the first side edges of the four heat absorption panels are arranged to form an interior square. More generally, the solar receiver can have three or more dual-exposure heat absorption panels, wherein the first side edges of the heat absorption panels are arranged to form an interior polygon.

Also disclosed herein in different embodiments is a solar energy system, comprising a solar receiver as described above and a field of heliostats. The field of heliostats is configured to direct sunlight towards the exposed faces of tube panels on the solar receiver.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
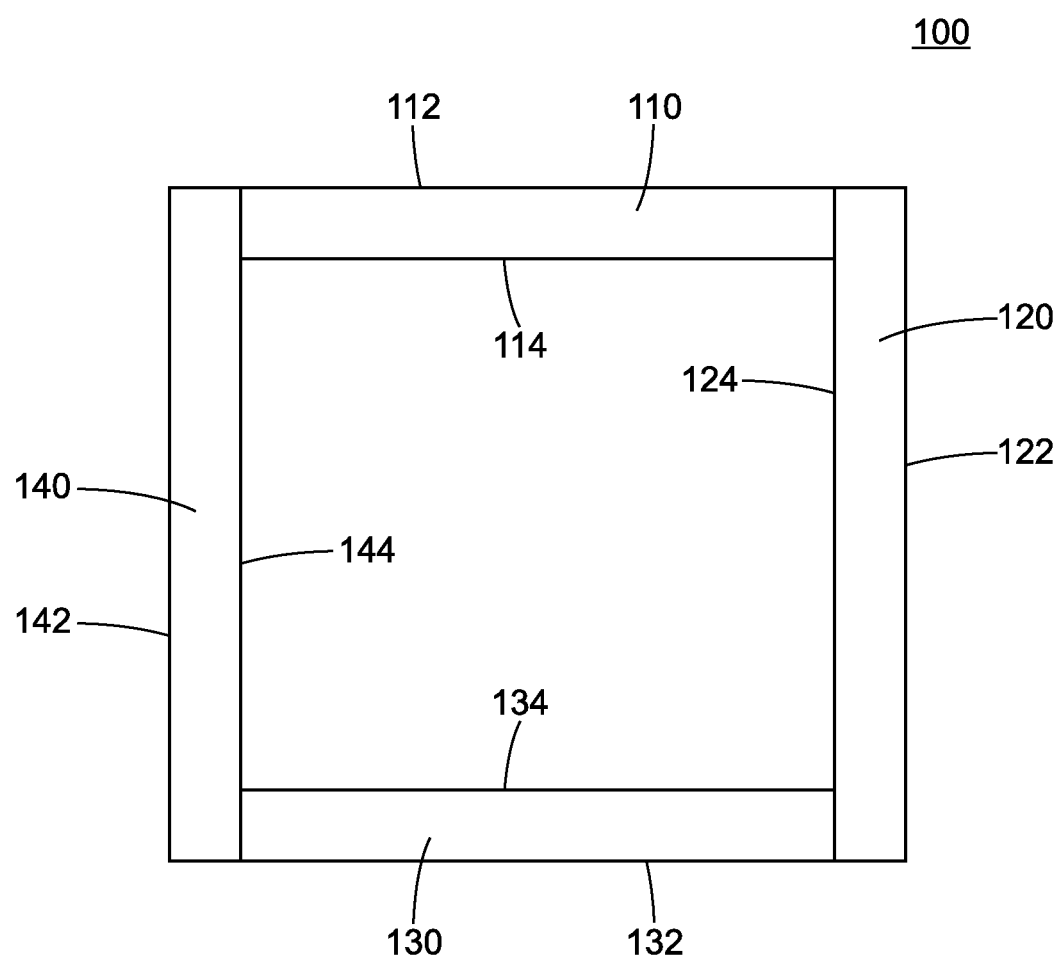
FIG. 1 is a plan (i.e. top) view of a conventional solar receiver design having a square orientation, with each tube panel having one exterior exposed face and one interior non-exposed face.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

It should be noted that many of the terms used herein are relative terms. For example, the terms "interior", "exterior", "inward", and "outward" are relative to a center, and should not be construed as requiring a particular orientation or location of the structure. Similarly, the terms "upper" and "lower" are relative to each other in location, i.e. an upper component is located at a higher elevation than a lower component.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other.

To the extent that explanations of certain terminology or principles of the solar receiver, boiler and/or steam generator arts may be necessary to understand the present disclosure, the reader is referred to *Steam/its generation and use*, 40th Edition, Stultz and Kitto, Eds., Copyright 1992, The Babcock & Wilcox Company, and to *Steam/its generation and use*, 41st Edition, Kitto and Stultz, Eds., Copyright 2005, The Babcock & Wilcox Company, the texts of which are hereby incorporated by reference as though fully set forth herein.

The present disclosure relates to a dual-exposure or two-sided heat absorption panel and to solar receivers incorporating one or more two-sided heat absorption panels. The panels are designed to accept heat on two opposite sides or faces, rather than on only one side or face. This can reduce tube failures due to fatigue or stress corrosion, and for a given panel size the available heat absorbing area is doubled compared to a single side heated panel. The panels may include one or more stiffener structures or heat shields. Generally, the solar receiver is located at the top of a vertical support structure which rises above a ground level or grade. The vertical support structure may be supported from a base. The heat transfer surfaces advantageously comprise loose tangent tube panels, which allows for unrestrained thermal expansion of the tubes/tube panels in both the horizontal and vertical directions, thereby eliminating additional tube stresses. As is known to those skilled in the art, the sizes of tubes, their material, diameter, wall thickness, number and arrangement for the heat transfer surfaces are based upon temperature and pressure for service, according to applicable design codes. Required heat transfer characteristics, circulation ratios, spot absorption rates, mass flow rates of the working fluid within the tubes, etc. are also important parameters which must be considered. Depending upon the geographic location where the solar receiver is to be installed, applicable seismic loads and design codes are also considered.

It should be noted that in some embodiments, molten salt is used as the heat transfer fluid (HTF) that is run through the absorption panel. In this regard, molten salt solidifies at approximately 430° F. (221° C., 494° K). When the tube panel(s) of the solar receiver is not exposed to light/heat, either intentionally at shutdown or unexpectedly due to a heliostat field malfunction, the molten salt can quickly cool and form plugs. Plugged tubes can cause delays at start up and could lead to tube failures. Thus, the ability to drain molten salt quickly is typically part of the solar receiver design. The valves and additional piping for such draining may not be depicted herein, but should be considered as being present. The present disclosure also contemplates the use of water, steam, or any other heat transfer fluid, with appropriate modifications made to other components of the solar receiver.

Figures 1A, 1B:
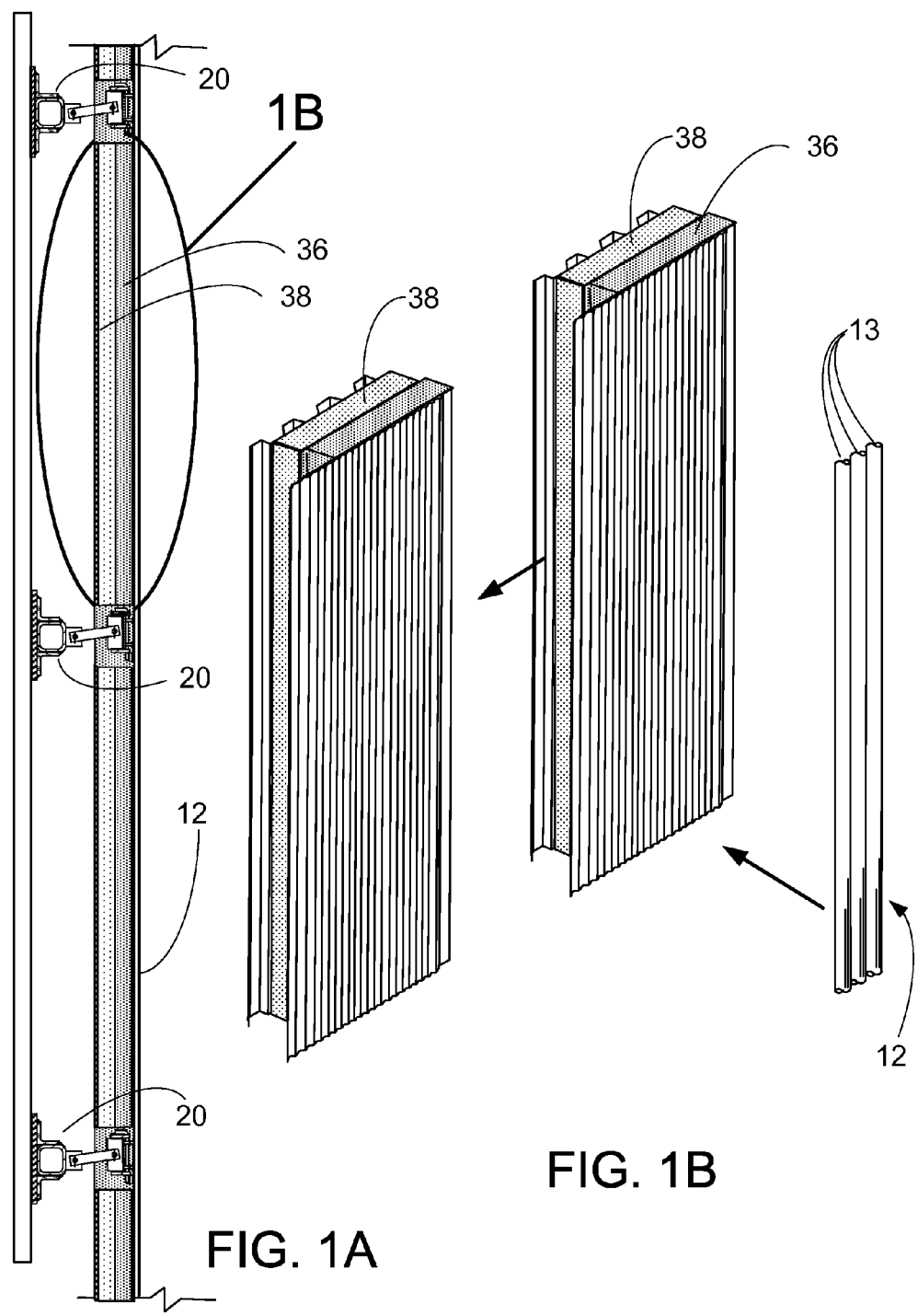
FIG. 1A is a side cross-sectional view of a conventional tube panel with a light barrier and insulation.
FIG. 1B is a perspective view of the panel of FIG. 1A.

FIG. 1A is a side view of a conventional tube panel 12 which utilizes one sided heat absorption, and FIG. 1B is an enlarged perspective exploded view of the tube panel. This one-sided heat absorbing tube panel is used in the conventional solar receiver of FIG. 1. A reflective modular panel light barrier 36 is located behind the tubes 13 (i.e. the non-exposed face of the tube panel) opposite the heat absorbing (i.e. exterior) side of the tube panel. The light barrier 36 is composed of an array of metal sheets and may be coated with white paint or other reflective material on the tube side to maximize reflectance of light energy back to the tubes and reduce operating temperatures of the barrier plate. The light barrier is supported by a tube attachment structure, such as a buckstay support system 20. Behind the light barrier (i.e. further interior of the solar receiver) is the insulation 38, which is covered by lagging. The light barrier is designed to protect the insulation 38, support structure 20, and the interior parts of the solar receiver from rain and heat exposure that may travel through the gaps between the loose tangent tubes of the tube panels.

Figure 2:
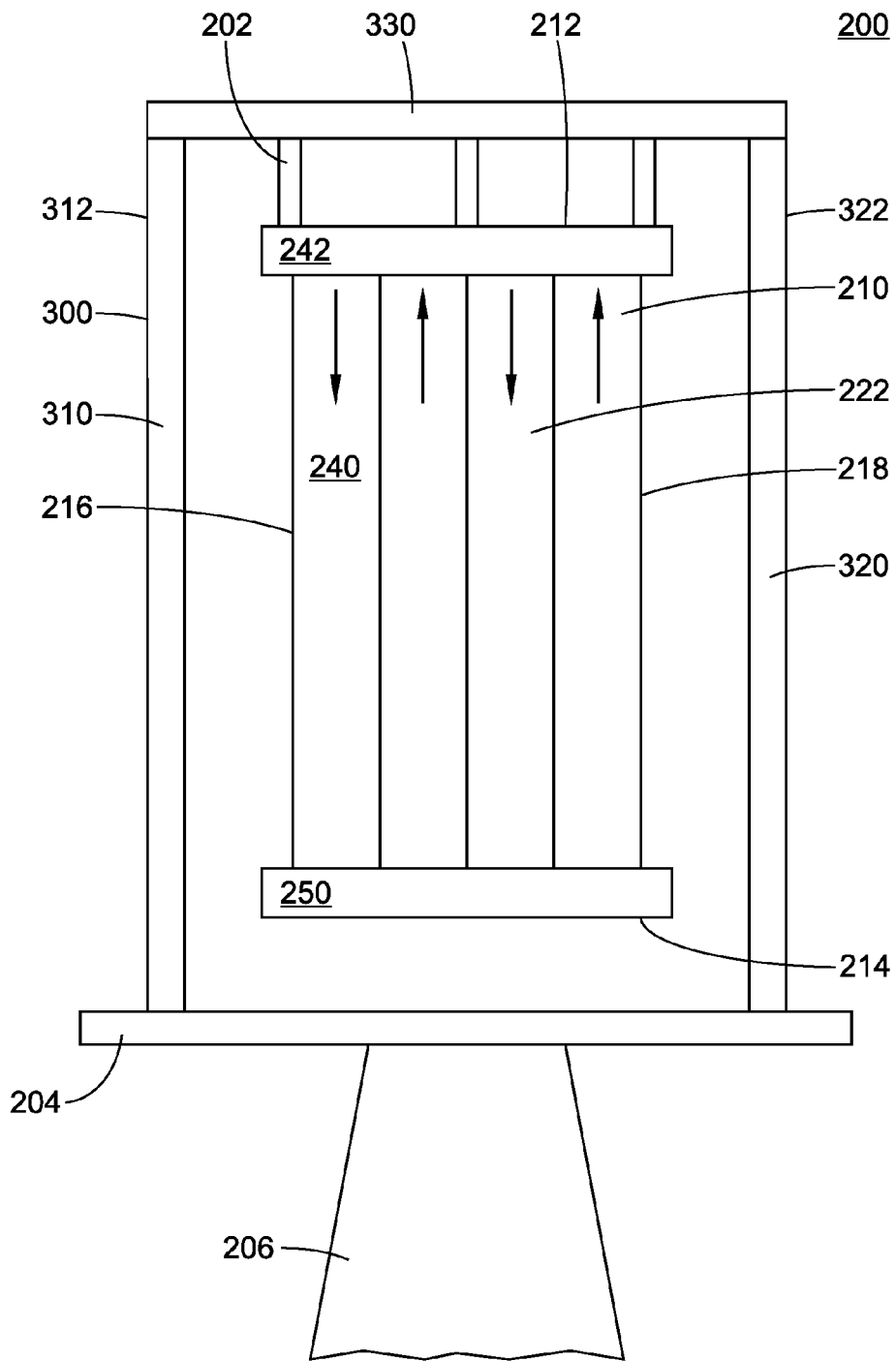
FIG. 2 is a first front view of a solar receiver of the present disclosure using a dual-exposure heat absorption panel having a limited number of tube passes. In this figure, heat shields and panel stiffener support structures are removed to provide an interior view.
Figure 3:
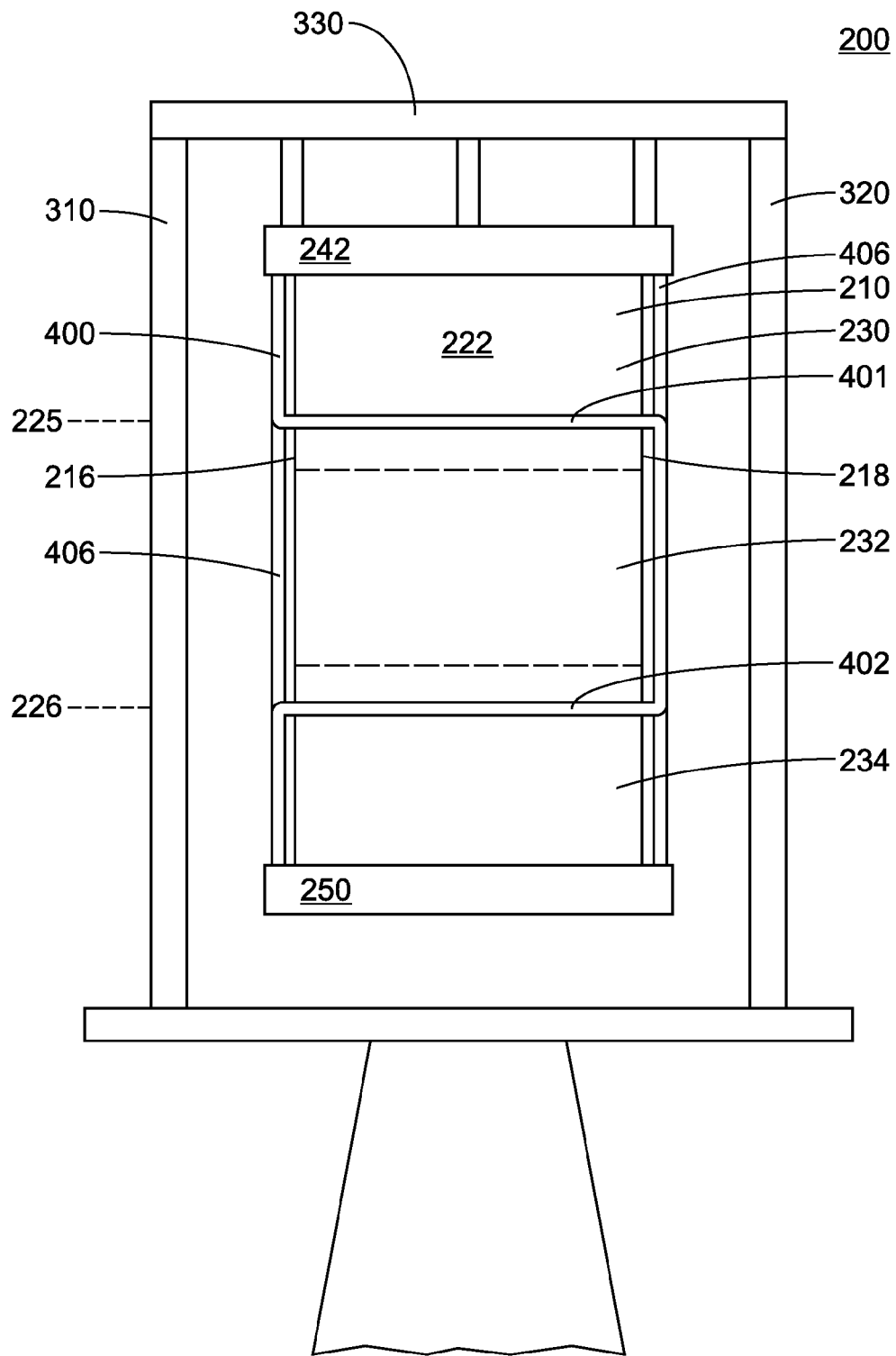
FIG. 3 is a second front view of a solar receiver of the present disclosure using a dual-exposure heat absorption panel. In this figure, panel stiffener support structures are visible, and heat shields are removed to provide another interior view.
Figure 4:
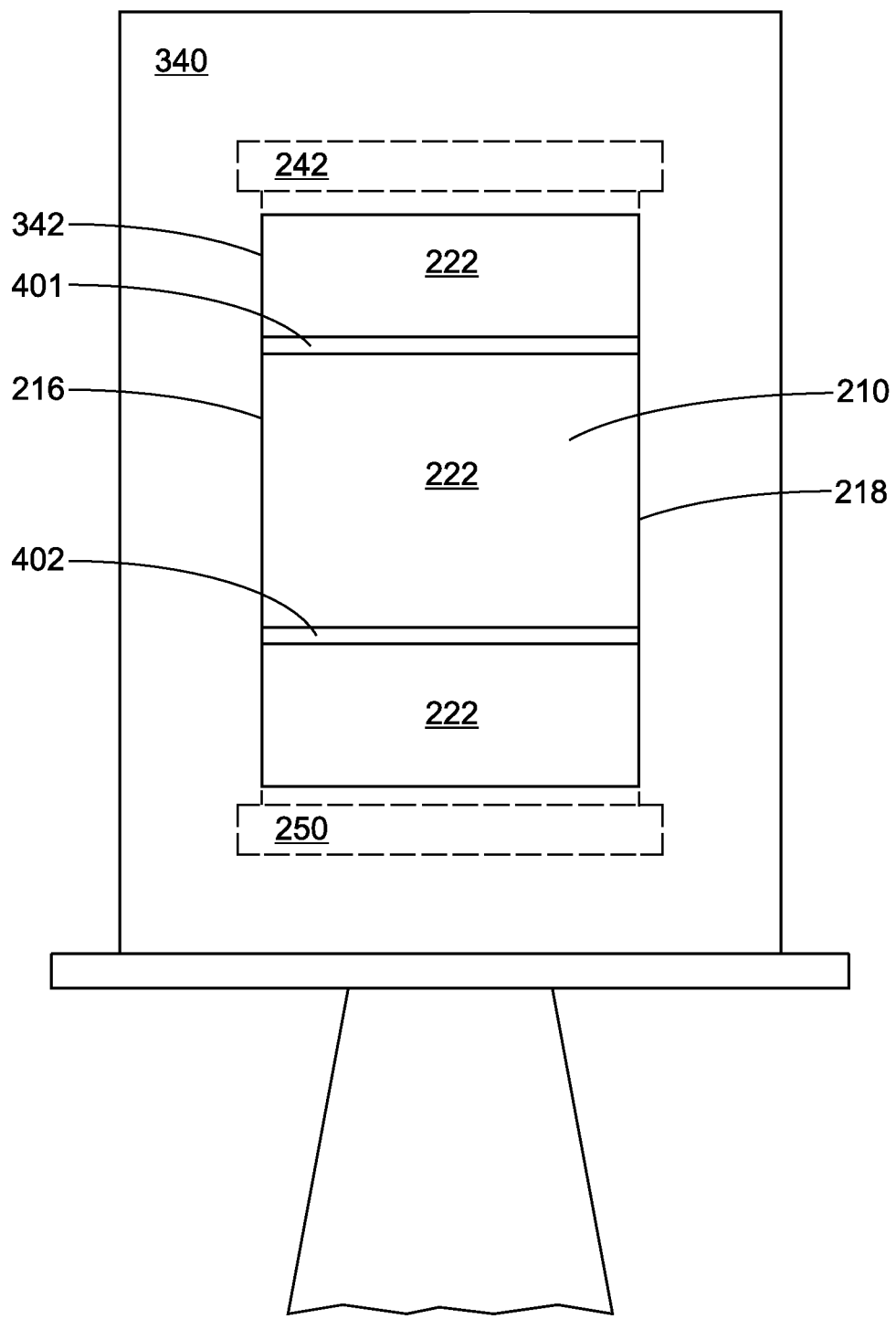
FIG. 4 is an exterior front view of a solar receiver of the present disclosure using a dual-exposure heat absorption panel. Here, the heat shields are in place.

FIGS. 2-4 are various front views of a solar receiver design with a dual-exposure or two-sided heat absorption panel, differing in the presence or absence of certain structures and allowing for a better comprehension of the present disclosure.

In FIG. 2, a two-sided heat absorption panel 200 is visible. The absorption panel 200 includes a tube panel 210. The tube panel 210 has a first exposed face 222 and a second exposed face 224 (not visible; see FIG. 5) opposite the first exposed face. The term "exposed" refers to the fact that concentrated sunlight from heliostats can be directed against the face of the tube panel. The first face 222 and second face 224 may also be referred to as exterior faces, which also refers to their being able to receive concentrated sunlight from heliostats. The first face and the second face are generally planar surfaces. The tube panel 210 extends between an upper header 242 and a lower header 250. Put another way, the tubes in the tube panel are interconnected by at least one upper header and at least one lower header. It should be noted that in practice, the tube panel may include multiple upper headers and lower headers. The tube panel 210 also has an upper edge 212, a lower edge 214, a first side edge 216, and a second side edge 218. It should be noted that in this view, one can see through the structure between the tube panel 210 and the structural support frame 300.

A structural support frame 300 runs along the upper edge 212, the first side edge 216, and the second side edge 218 of the tube panel. The structural support frame 300 includes a first vertical column 310, a second vertical column 320, and an upper horizontal beam 330 extending from an upper end 312 of the first vertical column to an upper end 322 of the second vertical column. As seen here, the first vertical column 310 is adjacent the first side edge 216, the second vertical column 320 is adjacent the second side edge 218, and the upper horizontal beam 330 is adjacent the upper edge 212 of the absorption panel. The tube panel 210 is connected to the structural support frame 300 through the upper header 242. Here, the tube panel is top supported. At least one panel support rod 202 extends between the structural support frame 300 and the upper header 242; three such panel support rods are shown here.

The structural support frame 300 rests upon a base platform 204, which may be considered as providing a platform for the absorption panel. The base platform 204 is attached to or located upon a tower 206.

Generally, a tube panel 210 requires at least one tube pass 240, an upper header 242, and a lower header 250. HTF flows from the inlet header to the outlet header (e.g. here the upper header can be the inlet header) and is heated in the tube pass by solar energy from heliostats. Each tube pass 240 includes at least one tube, and generally includes a plurality of such tubes. In FIG. 2, the tube panel is shown with a plurality of tube passes (here four). The tube panels and tube passes contemplated herein are of loose tube construction to allow independent differential expansion between tubes, reducing tube stresses. The exposed faces of the tubes may be coated or painted to increase/maximize heat absorption, for example with a special high temperature black paint. Adjacent tube passes are arranged so that heat transfer fluid flows upward through one tube pass and down through another tube pass in a serpentine manner. Various fluid flow arrangements may be used to facilitate draining of the HTF and minimize the number of vent and drain valves. Arrows here illustrate one such fluid flow arrangement.

In FIG. 3, two stiffener structures are shown. Each stiffener structure preferably runs from the first side edge 216 to the second side edge 218 across the first face 222 and the second face 224 of the tube panel. Here, a first stiffener structure 401 is located at a first support elevation 225 and a second stiffener structure 402 is located at a second support elevation 226. The two stiffener structures are arranged in parallel. As explained further below, each stiffener structure is formed from two support assemblies, one support assembly on each face of the tube panel. Each support assembly includes a support tube. Here, support tube 400 is visible on this first face. The support tube 406 provides stiffener structures on the second face.

Generally, the number of stiffener structures can depend on the maximum unsupported length of the tube panel that will resist wind and seismic loads. In this regard, the tube panel 210 can be considered as being divided into an upper section 230, a middle section 232, and a lower section 234, which generally (but not necessarily) divide the exposed portion of the tube panel into equal sections along its height. The first stiffener structure 401 is shown in the upper section 230, and the second stiffener structure 402 is shown in the lower section 234. Put another way, the stiffener structures are typically not located in the middle section. This keeps the stiffener structures out of the peak heat flux zone and reduces their operating temperatures. It is contemplated that the stiffener structures will include support tubes that will be cooled by some heat transfer fluid, which could be the same as or different from the HTF that is passed through the tube panel. For example, the use of oil or water can eliminate the potential for molten salt freezing in the stiffener structure during startup and shutdown. Here, the stiffener structures are illustrated as being formed in part by a support tube 400 which is connected to the upper header 242 and lower header 250, which uses the same HTF as that passing through the tube panel 210. The stiffener structures 401, 402 are the portions of the support tube 400 that run across the face 222 of the tube panel 210. The circuitry is ultimately designed to minimize temperatures and stresses, allow independent thermal expansion of the stiffener structure, and minimize the potential for freezing of fluid during startup. The outer face of the stiffener structure can be painted or coated to reduce/minimize heat absorption.

In FIG. 4, the structural support frame (not visible; see FIG. 2) is shown with heat shields mounted to protect certain parts of the design from exposure to the concentrated sunlight coming from the heliostats. The structural support frame 300 is not visible in FIG. 4, but is visible in FIG. 2. Here, a first heat shield 340 frames the first face 222 of the tube panel 210. A second heat shield 360 (not visible; see FIG. 5) also frames the second face 224 of the tube panel. In this regard, the heat shield 340 includes an interior edge 342 that forms a window in the heat shield through which the tube panel 210 is visible. Dotted lines show the outline of the tube panel 210, the upper header 242, and the lower header 250. As seen here, the interior edge 342 of the heat shield abuts the side edges 216, 218 of the tube panel, but could also be arranged with a gap between the heat shield and side edges of the tube panel to reduce spillage onto the heat shields. Each heat shield 340, 360 could also be considered as having an upper face, a first side face, a second side face, and a lower face. The first heat shield and the second heat shield are generally made from a heat-resistant material. The heat shield(s) can also be coated or painted with a reflective high temperature white paint to decrease/minimize heat absorption and/or operating temperature.

Figure 5:
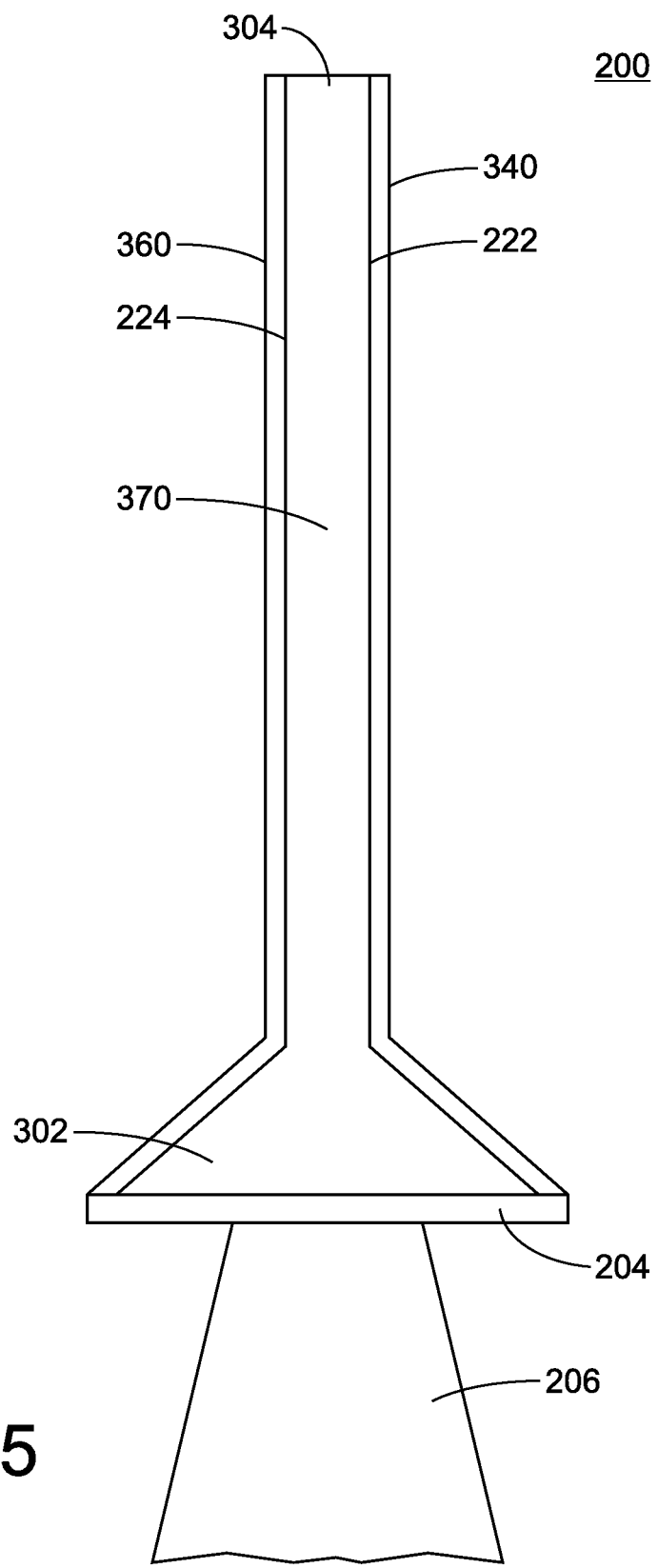
FIG. 5 is an exterior side view of a solar receiver of the present disclosure.

FIG. 5 is an exterior side view of the solar receiver design. The first heat shield 340 and the second heat shield 360 are visible here. The exposed first face 222 and second face 224 are also indicated. The base 302 of the structural support frame is shown here as being wider than the apex 304 of the structural support frame; this provides additional stability. It should be noted that a heat shield 370 is also present on the sides of the structural support frame 300.

Figure 6:
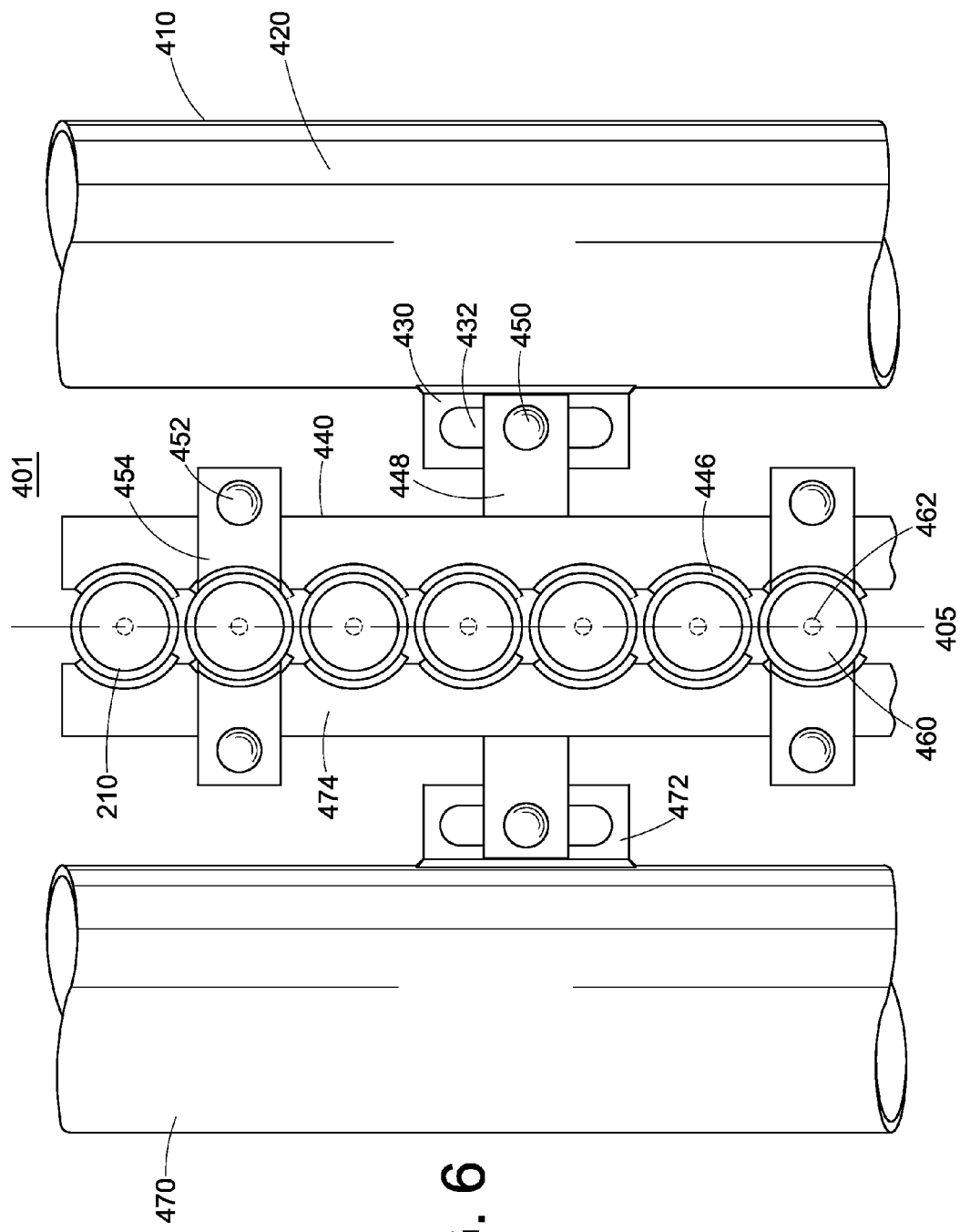
FIG. 6 is a plan view showing a tube panel and a stiffener structure for the tube panel of the present disclosure.
Figure 7:
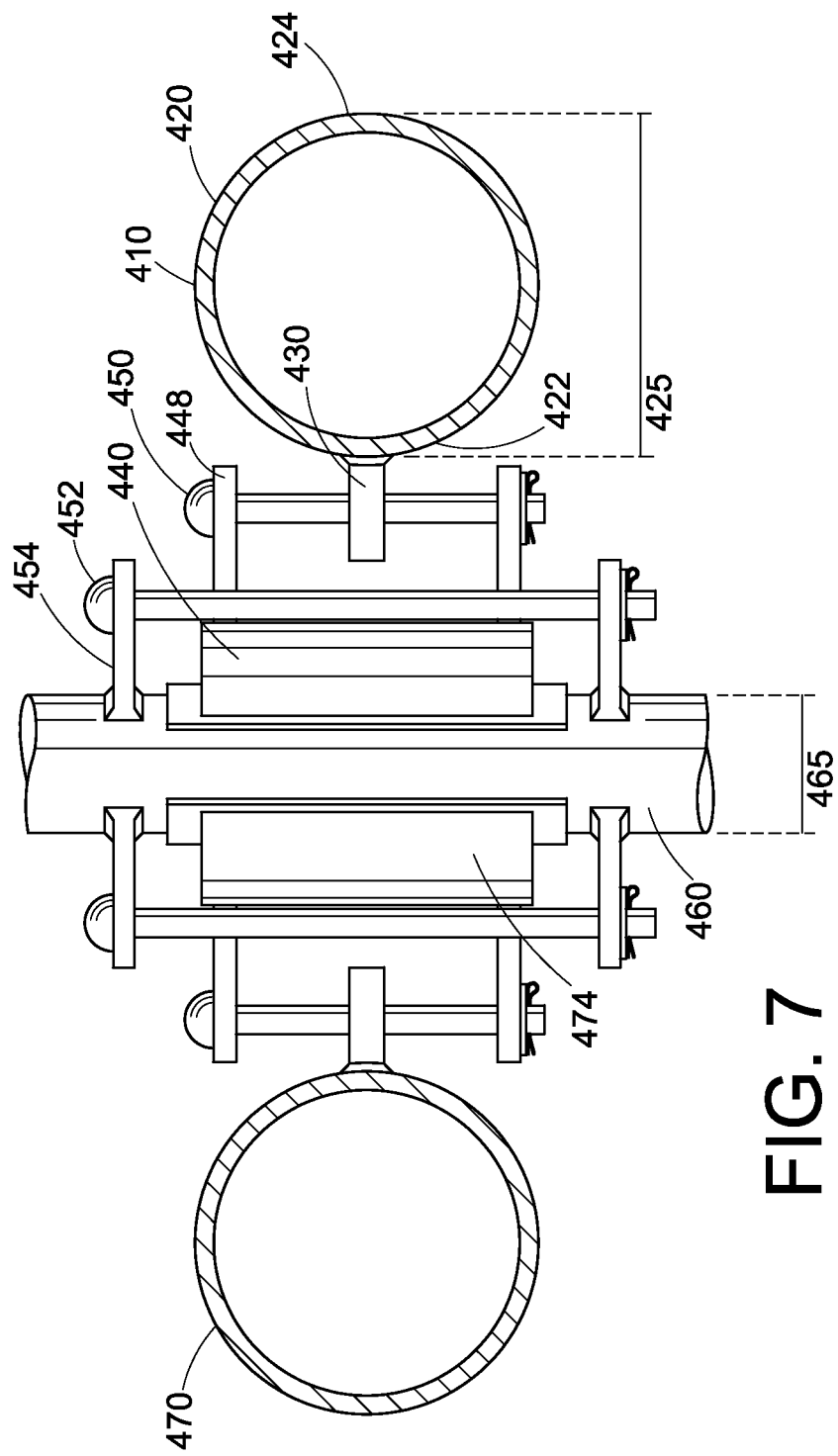
FIG. 7 is a side cross-sectional view of a tube panel and a stiffener structure for the tube panel as depicted in FIG. 6.
Figure 8:
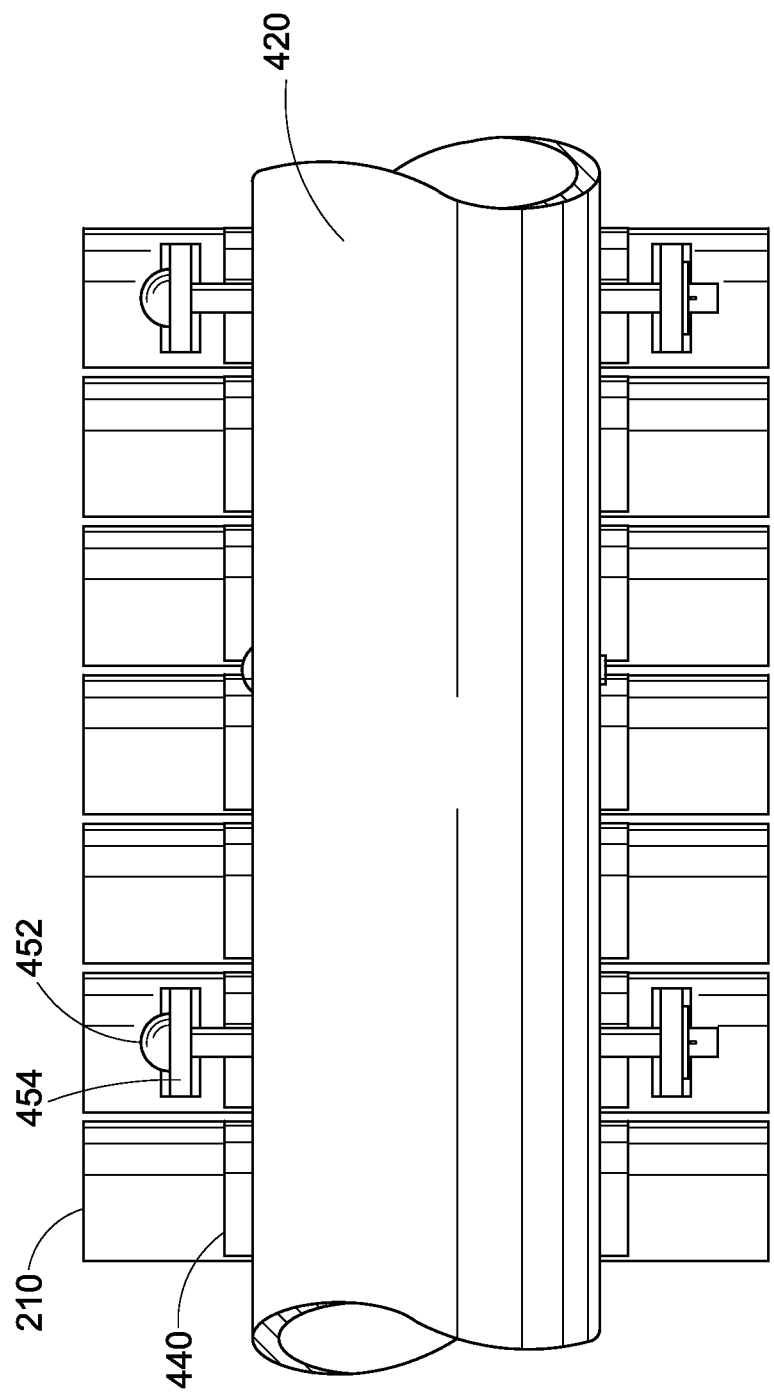
FIG. 8 is a front view of the tube panel and stiffener structure as depicted in FIG. 6.
Figure 8A:
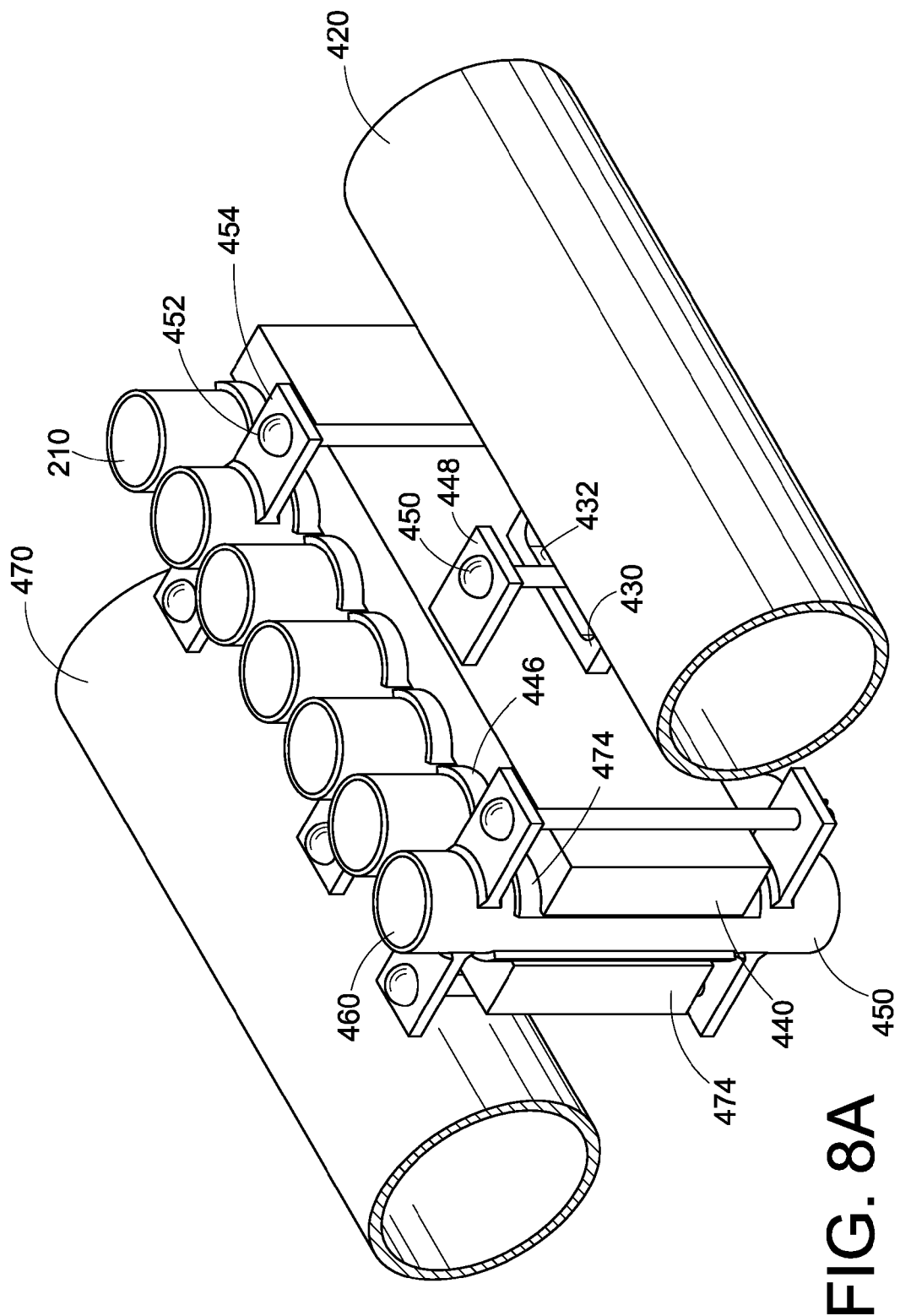
FIG. 8A is a perspective view of the tube panel and stiffener structure as depicted in FIG. 6.

As noted in FIG. 3, stiffener structures are used to support and strengthen the tube panel. FIGS. 6-8A are different views of one exemplary embodiment of a stiffener structure. FIG. 6 is a plan (i.e. top) view of the exemplary embodiment. FIG. 7 is a side cross-sectional view of the exemplary embodiment. FIG. 8 is a front view of the exemplary embodiment. FIG. 8A is a perspective view.

Referring to FIG. 6, the stiffener structure 401 is formed from a first support assembly 410 and a second support assembly 470, which are located on the opposite exposed faces of the tube panel. (Referring back to FIG. 3, the first support assembly 410 is part of the support tube 400, and the second support assembly 470 is part of the support tube 406.) Each support assembly 410 includes a support tube 420, horizontal flange 430, and scallop bar 440. The support tube 420 is contemplated to be hollow and allow a cooling fluid to pass through. A horizontal flange 430 extends from the support tube inwards towards the tube panel 210. The horizontal flange 430 has a slot 432 therein. As seen here, the horizontal flanges 430, 472 on the two support assemblies are opposed to each other. The scallop bar 440 has a contoured face that engages the tube panel 210, and lugs 448 on an opposite face. The scallop bar is connected to the support tube by a pin 450 which passes through the lugs 448 and the slot 432. The scallop bar is held snug (but not fixed) against the panel tubes 460 with pins 452 that pass through lugs 454 that are welded to some of the panel tubes, and the scallop bar engages one or more of the tubes. The lugs 454 holding the scallop bar 440 between the tubes 460 and pins 452 are offset from the lug 448 connecting the scallop bar 440 to the support tube 420. This allows the panel tubes and scallop bars to thermally expand in unison in the vertical direction, independent of the relatively stationary (in the vertical direction) support assembly. A protective sleeve 446 can be placed between the panel tube and the scallop bar as shown to protect the tubes from wear and/or gouging if any relative motion (sliding contact) occurs between the scallop bar and panel tubes. It is noted that only one pair of flanges and lugs 430, 478 is depicted here, but additional flanges and lugs may be present on each support assembly to resist panel twisting and maintain panel-to-panel alignment. Similarly, only one scallop bar 440 is shown attached to support tube 420, but multiple scallop bars could be used along the support tube to stiffen a single wide panel or multiple panels, for example, if there is a significant difference in vertical thermal expansion between tubes within a panel or between panels, as desired. Also, each scallop bar 440 could have multiple lugs 448. The stiffener structure can be supported by the structural support frame (see FIG. 3). The support tubes can be attached or connected to the vertical columns of the support frame, though they are not shown here as such.

The stiffener structure allows for independent thermal expansion of the individual tubes in the tube panel, as well as for independent thermal expansion of the stiffener structure and the support tubes. The pin/slot arrangement between the scallop bar and the support tube permits the support tubes to thermally expand axially independently of the radial expansion of the tubes in the tube panel. (Note the axis of the support tube is perpendicular to the axis of the tubes in the tube panel.)

The support system described above allows the individual tubes 460 to be arranged in a tangent tube fashion with minimal gap between the tubes. This reduces energy loss from light passing through the gaps and therefore increases receiver heat absorption and efficiency. The individual tubes 460 are seen here with their centers 462 along the midline 405 of the tube panel. Other variations on the tube layout are also contemplated.

Referring now to FIG. 7, in some embodiments, the support tube 420 of the support assembly could have a different diameter 425 from the diameter 465 of any tube 460 in the tube panel to provide the support tubes with additional stiffness and in order to stiffen the panel and shade the parts associated with the support assembly, thus reducing part operating temperatures. In some embodiments, the support tube diameter 425 is larger than the diameter 465 of any tube 460 in the tube panel. The support tube 420 can also be considered as having an inner face 422 and an outer face 424, the outer face being exposed to reflected sunlight from the heliostats. The outer face 424 of the support tube can be coated or painted to decrease/minimize heat absorption and/or operating temperature.

Referring to FIG. 3, at least three variations on the stiffener structures are specifically contemplated. First, the support tubes 400, 406 that make up the stiffener structures 401, 402 are illustrated as being connected to the upper header 242 and the lower header 250, so that they use the same HTF as flows through the tube panel 210. However, other embodiments are contemplated in which the support tubes use a different cooling fluid. This could be accomplished, for example, by connecting the support tubes to separate headers. Second, support tube 400 is illustrated here as contributing the support assembly to both stiffener structures 401, 402. In other embodiments, the stiffener structures could be made using separate support tubes. For example, a support tube could run across the first support elevation 225, but would not run back across the second support elevation 226; a different support tube could be used for the stiffener structure at the second support elevation if necessary. Third, as illustrated here a stiffener structure 401 uses two separate support tubes 400, 406. Other embodiments are contemplated where only one support tube is used for the stiffener structure. This could be done, for example, by forming the support tube as a rectangular torus that surrounds the tube panel. This single support tube would provide the stiffener structure 401 adjacent to the first face of the panel and then wrap around the panel at the same elevation and provide the stiffener structure adjacent to the opposite face of the tube panel. This could be done at the second stiffener structure elevation 402 also by the same support tube or a different support tube.

It is also noted that in FIG. 3, each support tube connects to the upper header and the lower header on the same side of the tube panel. For example, support tube 400 connects to both the upper header 242 and the lower header 250 along first side edge 216. It should be understood that this may differ. For example, if only one stiffener structure is present, support tube 400 could connect to the upper header 242 along first side edge 216, then cross the first face and connect to the lower header along second side edge 218.

Figure 9:
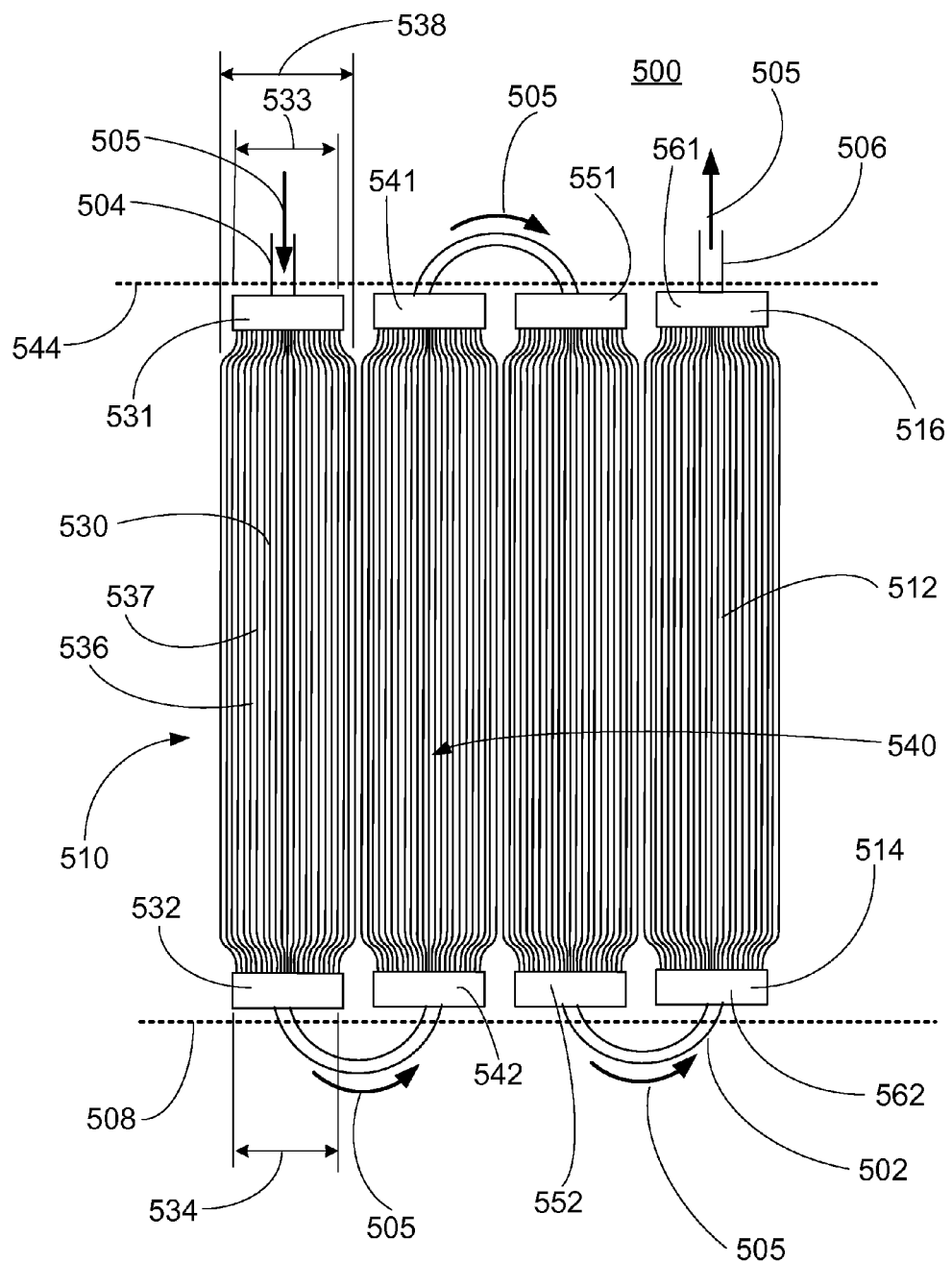
FIG. 9 is an enlarged front view of a tube panel without stiffener structure showing the tube panel having multiple tube passes, upper headers, and lower headers.

FIG. 9 is an enlarged front view of the tube panel, with the stiffener structure removed. Generally speaking, the tube panel 500 includes a plurality of tube passes 510, depicted here with four tube panels. Each tube pass comprises one or more tubes 512 which are parallel to each other. The tubes 512 pass between an inlet header 514 and an outlet header 516 to form a body or wall 537 upon which the focused solar energy from the heliostats can be directed. The tube passes 510 are interconnected using jumper pipes 502. The tube passes 510 are organized in a vertical or axial direction, such that the heat transfer fluid flows in an alternating up-down direction through the tube passes, which is indicated with arrows 505. This change in flow direction is referred to herein as a serpentine flow path.

The flow path begins at inlet 504 and ends at outlet 506. It should be noted that if there is an even number of tube passes 510, the inlet 504 and the outlet 506 may be located along a common edge 508 or 544 of the tube panel 500. Alternatively, the inlet 504 and outlet 506 can be located on opposite edges 508 and 544 of the tube panel 500 when an odd number of tube passes is used. In other words, the inlet and the outlet can be independently located at the top edge 544 or the bottom edge 508, as required by the design of the receiver. As depicted here, the inlet 504 and the outlet 506 are both located along the top edge 544.

An inlet header is defined as such relative to the direction of flow. Thus, for tube pass 530, header 531 is considered the inlet header and header 532 is considered the outlet header. However, for adjacent tube pass 540, header 542 is considered the inlet header and header 541 is considered the outlet header. The headers of the tube passes can also be designated as upper headers 531, 541, 551, 561 and lower headers 532, 542, 552, 562 wherein the upper headers are located above the lower headers. Put another way, one set of headers 532, 542, 552, 562 is located in lower plane 508, and the other set of headers 531, 541, 551, 561 is located in an upper plane 544.

Referring again to tube pass 530, the tubes 536 form a body 537. The tubes are closely spaced and parallel to each other. The upper header 531 has a width 533, and the lower header 532 has a width 534. In some contemplated embodiments, and as illustrated here, the body 537 can have a width 538 that is greater than the header widths 533, 534. In other words, the body 537 may be wider than the lower header 532 and the upper header 531. The width is measured in the horizontal direction. The lower header and the upper header of each tube panel are the same width. The ratio of the body width 537 to the width of the lower header or upper header 532, 531 can at least 1.01:1, and may range from 1.01 to 1.5. This permits the spacing between edge tubes in adjacent panels to be the same as the close spacing between tubes within a panel. In such embodiments, the upper headers of adjacent tube panels would be laterally separated from each other. The lower headers of adjacent tube panels would also be laterally separated from each other. This may allow the tube panels to expand differentially with respect to each other because they are operating at different temperatures.

Figure 10:
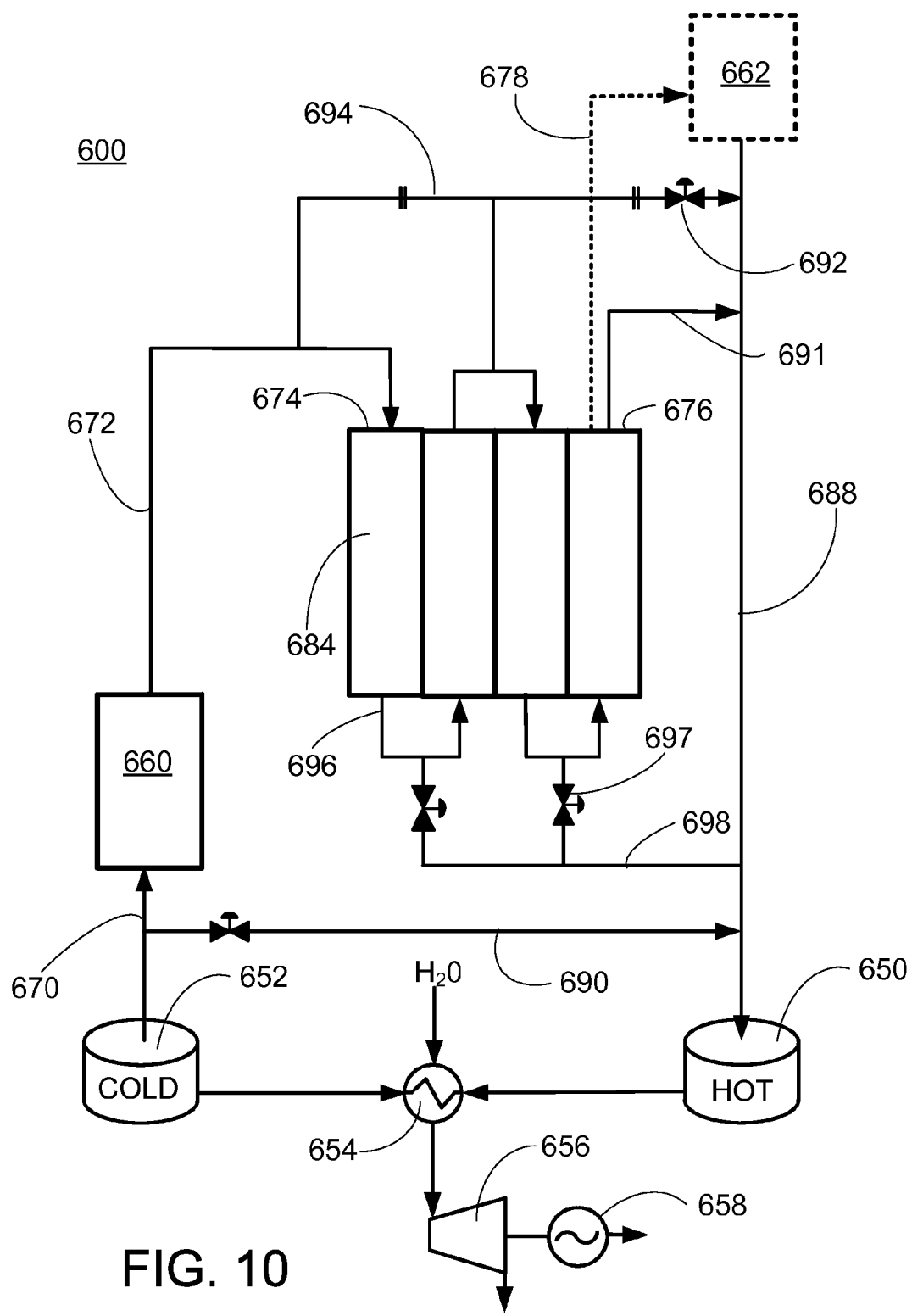
FIG. 10 is a schematic showing fluid flow through the dual-exposure heat absorption panel.

FIG. 10 is a schematic diagram illustrating fluid flow through the dual-exposure heat absorption panel 600. Initially, a riser 670 provides cold fluid to an inlet vessel 660 from cold storage tank 652. For example, "cold" molten salt may be pumped from the cold storage tank having a temperature of about 550° F. An inlet pipe 672 fluidly connects the inlet vessel 660 to the tube panel inlet 674. The jumper pipes 696 between tube passes are also illustrated. An outlet pipe 678 fluidly connects the tube panel outlet 676 to an outlet vessel 662. The heat transfer fluid (HTF) can flow from the inlet vessel 660 through the tube panel 684 to the outlet vessel 662. A downcomer pipe 688 leads from the outlet vessel 662 back down to grade, where the "hot" fluid can flow into hot storage tank 650.

The inlet vessel 660 is optional and not required, which is indicated by the use of dotted lines, for example if the heat transfer fluid is steam/water. The outlet pipe 678 and outlet vessel 662 are also optional and not required, which is indicated by dotted line. Without an outlet vessel, the HTF flows from the tube panel outlet 676 directly to the downcomer pipe 688 via outlet pipe 691. A bypass line 690 also connects the riser 670 to the downcomer pipe 688. If desired, this bypass flow path can prevent the HTF from flowing through the tube panel 684.

This completes the energy collection process. The stored thermal energy in the heat transfer fluid can be used to generate steam and electricity. This is done by, for example, pumping the hot HTF from the hot storage tank 650 through the shell side of a heat exchanger 654. Water enters the tube side of heat exchanger 654 and is converted to steam. The steam can be sent to turbine 656, which drives an electrical generator 658. The cooler HTF leaving the heat exchanger then returns to the cold storage tank 652, where it is pumped to the receivers to repeat the energy collection process described above.

For a molten salt receiver, the tube panels must be fully drainable and ventable. The receiver is usually drained when not in use, at sunset, or when available solar energy is too low. Molten salt solidifies at approximately 430° F. (221° C., 494° K). If not drained, the salt can freeze inside the tubes, plug the receiver, and could rupture the tubes. As seen here, the solar receiver can include a vent valve 692 for each independent flow path which are both vented through the top of the downcomer pipe 688. The vent valve is typically located near the top of the downcomer pipe 688, and the vent piping 694 is also illustrated connecting the flow path to the downcomer pipe. One drain valve 697 is typically provided for each pair of tube passes, and is located beneath the tube passes. The drain piping 698 is also illustrated, and connects to the downcomer 688 so that fluid present in the tube panel drains and flows into the downcomer pipe 688. The vent valves and drain valves are automated.

It should be noted that in FIG. 10, the various pipes are illustrated as being relatively straight fluid paths. However, it will be appreciated by those skilled in the art that their actual design in terms of arrangement and length will be determined by the degree of flexibility required to accommodate expected motions caused by thermal expansion and contraction during operation of the solar receiver. It is thus likely that additional bends or length may be necessary to provide such flexibility.

Figure 11:
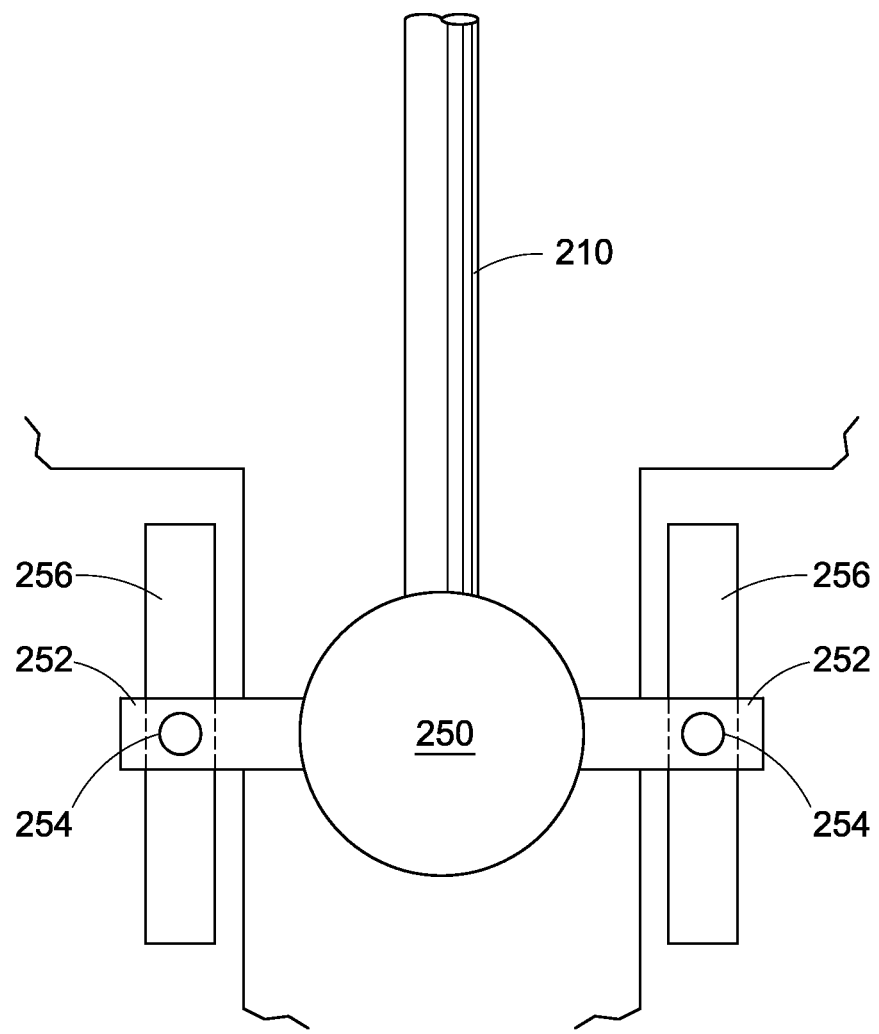
FIG. 11 is a side cross-sectional view of the tube panel and the lower header showing a guidance structure.

FIG. 11 is a side cross-sectional view showing the lower header 250 of the tube panel 210. As previously noted, the tube panel is connected to the structural support frame through the upper header. It is contemplated that the lower header is guided. This allows unrestrained thermal expansion of the tube panel in the vertical direction while still providing restraint for wind and seismic loading in the horizontal direction. Here, one design is shown for guiding the lower header. The lower header 250 and the related structures here are not exposed to sunlight because they are covered by the heat shield. The tube panel 210 extends away from the lower header 250. Attached to the lower header is a pair of horizontal flanges 252 with pins 254 running through vertically-oriented guide slots 256. As the tube panel 210 expands or contracts axially, the lower header 250 can move within the guide slots 256. The guide slots themselves can be connected to a stable base, such as the base platform or the structural support frame, as appropriate.

Figure 12:
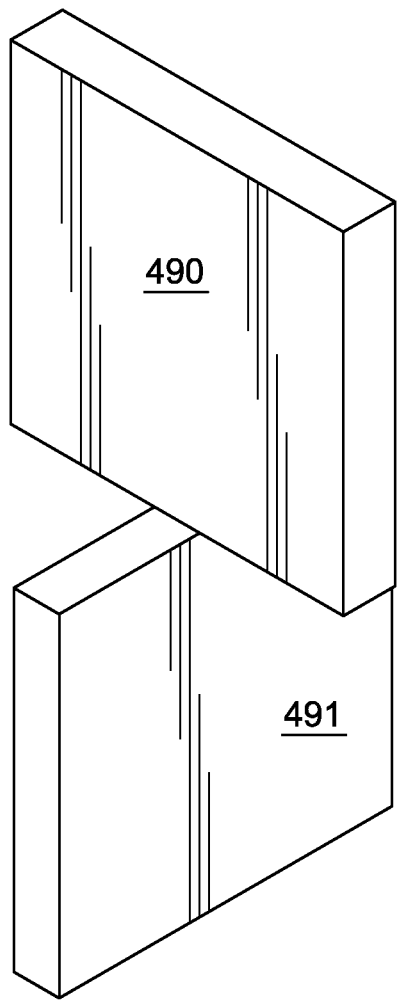
FIG. 12 is a perspective view of a second solar receiver design using two of the dual-exposure heat absorption panels discussed, with one panel atop and perpendicular to another panel.
Figure 13:
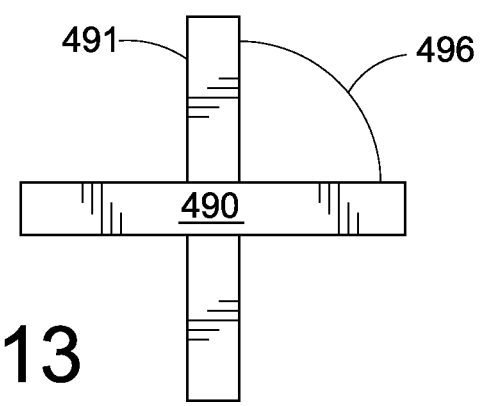
FIG. 13 is a plan view of the second solar receiver design of FIG. 12.

FIG. 12 is a perspective view of another solar receiver design, while FIG. 13 is a plan view of the same design. This design uses two two-sided heat absorption panels, with one panel 490 located above the other panel 491. As seen in FIG. 13, the two are oriented perpendicularly to each other, as reflected in angle 496, though this angle can be varied.

Figure 14:
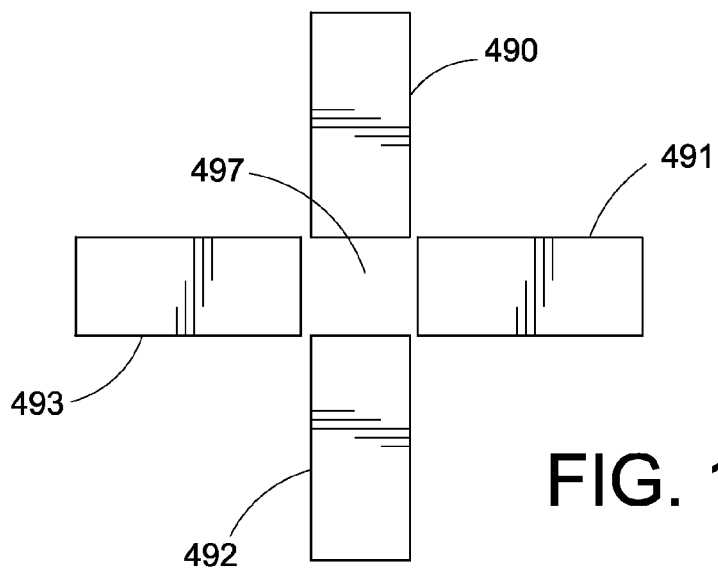
FIG. 14 is a plan view of a third solar receiver design using four of the dual-exposure heat absorption panels discussed, arranged in a plus-sign or cross shape configuration.

FIG. 14 is a plan view of another solar receiver design, here using four two-sided heat absorption panels. Here, the four heat absorption panels 490, 491, 492, 493 are located at the same elevation or grade. The first side edges of the four heat absorption panels are arranged to form an interior square 497. This arrangement might also be referred to as a plus-sign or a cross-shaped design.

Figure 15:
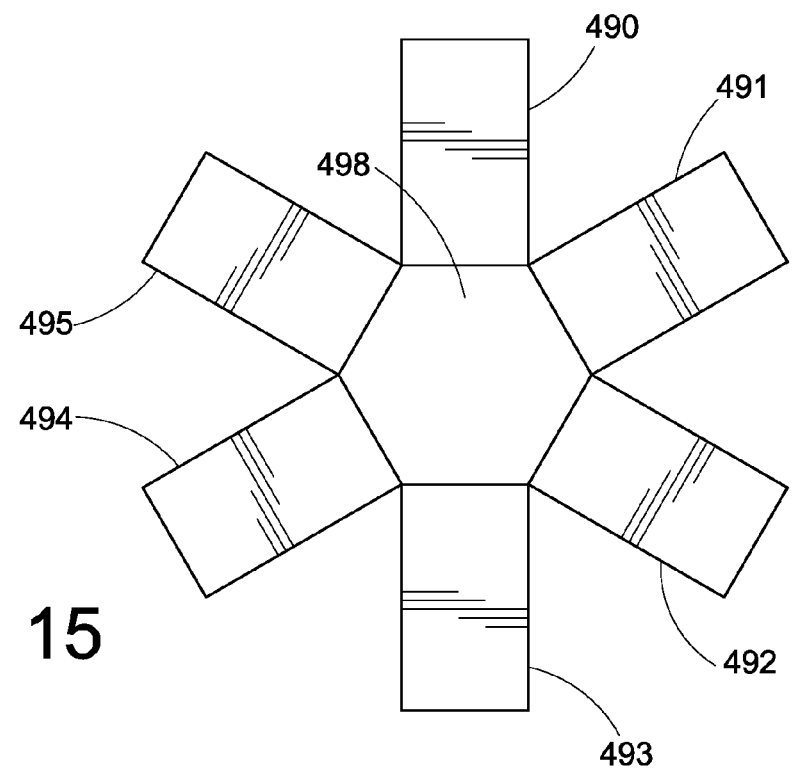
FIG. 15 is a plan view of a fourth solar receiver design using six of the dual-exposure heat absorption panels discussed, arranged to form an interior polygon with the panels extending like spokes.

The design of FIG. 14 can be generalized to be a design having three or more two-sided heat absorption panels, wherein the first side edges of the heat absorption panels are arranged to form an interior polygon. The heat absorption panels are thus arranged like spokes extending from the interior polygon. For example, with three heat absorption panels, the interior polygon would be a triangle. FIG. 15 is a plan view of a design using six heat absorption panels 490, 491, 492, 493, 494, 495. The resulting interior polygon 498 has the shape of a hexagon. The interior polygon could be used to contain additional parts that should not be exposed to concentrated sunlight.

The quantities of the heat absorption panels and the tube sizes are designed to provide adequate cooling for a given solar receiver thermal rating and corresponding fluid flow. However, the solar receiver of the present disclosure is flexible and different quantities of tube panels and/or other tube sizes are possible depending on the desired thermal rating of the solar receiver and the corresponding fluid flow as long as tube metal temperatures and stresses are acceptable.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

What is claimed is:
1. A dual-exposure heat absorption panel, comprising:
a tube panel comprising a plurality of vertical tubes for conveying a first heat transfer fluid, wherein the tubes are interconnected by at least one upper header and at least one lower header, and wherein the tube panel has a first exposed face, an opposite second exposed face, an upper edge, a lower edge, a first side edge, and a second side edge; and a structural support frame that runs along the upper edge, the first side edge, and the second side edge of the tube panel; and a first stiffener structure running from the first side edge to the second side edge across the first exposed face and the second exposed face of the tube panel at a first support elevation, and back to the first side edge at a second support elevation;

wherein the first stiffener structure is formed from a first support assembly and a second support assembly;

wherein each support assembly includes a support tube for conveying a second heat transfer fluid, a horizontal flange extending from the support tube and having a slot therein, and a scallop bar engaging one or more vertical tubes of the tube panel and having at least one lug, the scallop bar engaging the horizontal flange by a pin passing through the at least one lug and the slot of the horizontal flange.

2. The dual-exposure panel of claim 1, wherein at least one panel support rod extends between the structural support frame and the at least one upper header.

3. The dual-exposure panel of claim 1, wherein the vertical tubes are arranged as a plurality of adjacent tube passes so that the first heat transfer fluid flows upward through one tube pass and down through another tube pass.

4. The dual-exposure panel of claim 1, wherein the first stiffener structure is connected to the at least one upper header and the at least one lower header, so that the first heat transfer fluid and the second heat transfer fluid are the same.

5. The dual-exposure panel of claim 1, wherein the support tube of each support assembly has a different diameter from any tube in the tube panel.

6. The dual-exposure panel of claim 1, wherein the first support elevation and the second support elevation are not located at a middle section of the tube panel.

7. The dual-exposure panel of claim 1, wherein the structural support frame includes a first vertical column, a second vertical column, and an upper horizontal beam extending from an upper end of the first vertical column to an upper end of the second vertical column.

8. The dual-exposure panel of claim 1, wherein the structural support frame further comprises a first heat shield framing the first exposed face of the tube panel, and a second heat shield framing the second exposed face of the tube panel.

9. The dual-exposure panel of claim 1, wherein the at least one lower header is guided.

10. A solar receiver comprising at least one dual-exposure heat absorption panel, wherein the dual-exposure heat absorption panel comprises:

a tube panel comprising a plurality of vertical tubes for conveying a first heat transfer fluid, wherein the tubes are interconnected by at least one upper header and at least one lower header, and wherein the tube panel has a first exterior face, a second exterior face opposite the first face, an upper edge, a lower edge, a first side edge, and a second side edge;

a structural support frame that runs along the upper edge, the first side edge, and the second side edge of the tube panel, the tube panel being connected to the structural support frame through the at least one upper header; and at least one stiffener structure running from the first side edge to the second side edge across the first exterior face and the second exterior face of the tube panel, and back to the first side edge at a second support elevation;

wherein the at least one stiffener structure is formed from a first support assembly and a second support assembly, each support assembly including a support tube for conveying a second heat transfer fluid, a horizontal flange extending from the support tube and having a slot therein, and a scallop bar engaging one or more vertical tubes of the tube panel and having at least one lug, the scallop bar engaging the horizontal flange by a pin passing through the at least one lug and the slot of the horizontal flange.

11. The solar receiver of claim 10, having two dual-exposure heat absorption panels with one heat absorption panel located above and oriented at an angle to the other heat absorption panel, or having four dual-exposure heat absorption panels, wherein the first side edges of the four heat absorption panels are arranged to form an interior polygon.

12. The solar receiver of claim 10, having three or more dual-exposure heat absorption panels, wherein the first side edges of the heat absorption panels are arranged to form an interior polygon.

13. A solar energy system, comprising the solar receiver of claim 10 and a field of heliostats configured to direct sunlight towards the solar receiver.

14. The dual-exposure panel of claim 1, wherein the structural support frame rests upon a base platform for supporting the dual-exposure heat absorption panel thereon.

15. The dual-exposure panel of claim 14, wherein the base platform is located on a tower and attached thereto.

16. The dual-exposure panel of claim 1, wherein the first stiffener structure is connected to separate headers from the tube panel, so that the first heat transfer fluid and the second heat transfer fluid are different.

17. The dual-exposure panel of claim 10, wherein the at least one stiffener structure is connected to separate headers from the tube panel, so that the first heat transfer fluid and the second heat transfer fluid are different.

18. A dual-exposure heat absorption panel, comprising:

a tube panel comprising a plurality of vertical tubes for conveying a first heat transfer fluid, wherein the tubes are interconnected by at least one upper header and at least one lower header, and wherein the tube panel has a first exposed face, an opposite second exposed face, an upper edge, a lower edge, a first side edge, and a second side edge; and a structural support frame that runs along the upper edge, the first side edge, and the second side edge of the tube panel; and a first stiffener structure running from the first side edge to the second side edge across the first exposed face and the second exposed face of the tube panel at a first support elevation, wherein the first stiffener structure is formed from a first support assembly and a second support assembly;

wherein each support assembly includes a support tube for conveying a second heat transfer fluid, a horizontal flange extending from the support tube and having a slot therein, and a scallop bar engaging one or more vertical tubes of the tube panel and having at least one lug, the scallop bar engaging the horizontal flange by a pin passing through the at least one lug and the slot of the horizontal flange; and wherein the first stiffener structure is connected to separate headers from the tube panel, so that the first heat transfer fluid and the second heat transfer fluid are different.

19. The dual-exposure panel of claim 18, wherein at least one panel support rod extends between the structural support frame and the at least one upper header.

20. The dual-exposure panel of claim 18, wherein the vertical tubes are arranged as a plurality of adjacent tube passes so that the first heat transfer fluid flows upward through one tube pass and down through another tube pass.

21. The dual-exposure panel of claim 18, wherein the support tube of each support assembly has a different diameter from any tube in the tube panel.

22. The dual-exposure panel of claim 18, further comprising a second stiffener structure running from the first side edge to the second side edge across the first exposed face and the second exposed face of the tube panel at a second support elevation.

23. The dual-exposure panel of claim 22, wherein the first support elevation and the second support elevation are not located at a middle section of the tube panel.

24. The dual-exposure panel of claim 18, wherein the at least one stiffener structure runs from the first side edge to the second side edge across the first exterior face and the second exterior face of the tube panel, and then runs back to the first side edge at a second support elevation.

25. The dual-exposure panel of claim 18, wherein the structural support frame includes a first vertical column, a second vertical column, and an upper horizontal beam extending from an upper end of the first vertical column to an upper end of the second vertical column.

26. The dual-exposure panel of claim 18, wherein the structural support frame further comprises a first heat shield framing the first exposed face of the tube panel, and a second heat shield framing the second exposed face of the tube panel.

27. The dual-exposure panel of claim 18, wherein the at least one lower header is guided.

28. A solar receiver comprising at least one dual-exposure heat absorption panel, wherein the dual-exposure heat absorption panel comprises:
  a tube panel comprising a plurality of vertical tubes for conveying a first heat transfer fluid, wherein the tubes are interconnected by at least one upper header and at least one lower header, and wherein the tube panel has a first exterior face, a second exterior face opposite the first face, an upper edge, a lower edge, a first side edge, and a second side edge;
  a structural support frame that runs along the upper edge, the first side edge, and the second side edge of the tube panel, the tube panel being connected to the structural support frame through the at least one upper header; and
  at least one stiffener structure running from the first side edge to the second side edge across the first exterior face and the second exterior face of the tube panel, wherein the at least one stiffener structure is formed from a first support assembly and a second support assembly, each support assembly including a support tube for conveying a second heat transfer fluid, a horizontal flange extending from the support tube and having a slot therein, and a scallop bar engaging one or more vertical tubes of the tube panel and having at least one lug, the scallop bar engaging the horizontal flange by a pin passing through the at least one lug and the slot of the horizontal flange;
  wherein the first stiffener structure is connected to separate headers from the tube panel, so that the first heat transfer fluid and the second heat transfer fluid are different.

29. The solar receiver of claim 28, having two dual-exposure heat absorption panels with one heat absorption panel located above and oriented at an angle to the other heat absorption panel, or having four dual-exposure heat absorption panels with the first side edges of the four heat absorption panels arranged to form an interior polygon.

30. The solar receiver of claim 28, having three or more dual-exposure heat absorption panels, wherein the first side edges of the heat absorption panels are arranged to form an interior polygon.

31. A solar energy system, comprising the solar receiver of claim 28 and a field of heliostats configured to direct sunlight towards the solar receiver.

* * * * *